Patented Oct. 13, 1942

2,298,607

UNITED STATES PATENT OFFICE 2,298,607

DECOMPOSING OZONE

William T. Anderson, Jr., Newark, N. J., assignor to Hanovia Chemical and Manufacturing Company, Newark, N. J., a corporation of New Jersey No Drawing. Application May 9, 1940,
Serial No. 334,168

1 Claim. (Cl. 23—4)

This invention relates to ultra-violet irradiation and is concerned in particular with the decomposition of ozone produced by the action of ultra-violet rays of short wave length upon the oxygen of the air.

The normal concentration of ozone in air is about 0.01 mg. per cubic meter of air. In the neighborhood of strong ultra-violet lamps the ozone concentration may reach 2 mg. per cubic meter of air but is ordinarily quickly diluted by admixture with surrounding air. However, where adequate ventilation in the neighborhood of such ultra-violet lamps is not provided or is not available the usual concentration of ozone is of the order of 0.2 mg. or more per cubic meter of air, a quantity which has a strong smell and is irritating to the human throat and nose. The presence of irritating quantities of ozone is encountered particularly in apparatus for photo-chemical processes, such as photo printing and the like. It is one object of my invention to eliminate objectionable concentration of ozone when produced by ultra-violet radiation. It is a further object to provide a simple and effective means for eliminating such ozone by decomposition thereof. It is a further object of my invention to provide apparatus for photo-chemical processes which shall be free from the irritating effects of the presence of excessive quantities of ozone formed by ultra-violet radiation used in such photo-chemical processes.

Ozone is an unstable compound so that if the production of ozone is stopped the ozone concentration decreases rapidly until the equilibrium of a concentration of about 0.01 mg. per cubic meter of air is established. However, in the employment of ultra-violet irradiation the supply of ozone is constant and is greater than the normal rate of natural decomposition. In apparatus for photo-chemical processes the ultra-violet lamp is enclosed in a housing and proper ventilation is not always practical or possible, with the result that an objectionable concentration of ozone takes place which affects the operator in an undesirable manner.

It is the prime feature of my invention to decompose the objectionable ozone by catalytic action as hereinafter described. The most efficient catalysts for the conversion of ozone into oxygen are the metals of the platinum group, which comprises the metals platinum, iridium, ruthenium, palladium, rhodium and osmium, among which metals platinum and palladium appear to be most effective for the purpose of decomposing ozone, metals outside the platinum group also being suitable to some extent.

In order to most effectively decompose the largest possible amounts of ozone with the smallest possible quantity of most efficient catalyst I deposit palladium or a mixture of palladium with other catalyst metals in a very thin coating on a fibrous support of glass wool or the like ceramic refractory material not deleteriously affected by ozone at any of the prevailing temperatures. The fibrous support and the catalyst is loosely arranged to form a conglomeration or loosely compacted agglomeration thereof such as a pad, cloth, or the like, which offers little resistance to the flow of air therethrough. The catalyst metal is deposited on the support in any suitable manner, as by chemical processes or the like. The ozone or the air or other gas containing the ozone is brought in contact with the supported catalyst, whereby ozone is decomposed by catalytic action.

The catalytic decomposition of ozone has a large temperature coefficient. While the catalyst described by me effectively decomposes ozone even at low temperatures, such decomposition takes place with considerably greater speed at elevated temperatures, such as temperatures over 100° C.

In one specific embodiment of my invention I employ glass wool coated with five (5) percent by weight of palladium. In order to experimentally evaluate the degree and rate of decomposition obtained with my supported catalyst I placed a 1200 watt quartz high pressure mercury arc lamp within an elongated glass cylinder through which air was forced at a rate of 1.2 cubic feet per second, and I located a pad of palladized glass wool in the end of the cylinder, the contact time of the passing air, including ozone, being about 0.1 second. An aqueous solution containing potassium iodide and starch was coated upon paper and the thus coated paper was held in the air flowing from the cylinder, the time required to produce on the paper a matched blue color giving a relative quantitative evaluation of the amount of ozone present. Whereas without my supported catalyst the blue color was produced within 2⅕ seconds at 32° C., within 3 seconds at 149° C., and within 4⅖ seconds at 185° C., with my supported catalyst of palladized glass wool the same matched blue color was produced within 5⅕ seconds at 32° C., within 13 seconds at 149° C., and within 18⅖ seconds at 185° C., thus showing the substantial quantities of ozone decomposed by my catalyst.

In apparatus for photo printing my catalyst has been very successful in operation and has eliminated the undesirable effects on operators who being thus freed from the objectionable irritation have been able to increase their own efficiency. In photo printing or other photo-chemical processes the catalyst can be located in an air duct for the ultra-violet generator, air including ozone passing through the air duct, the ozone being decomposed on contact with the large surface of catalyst. If it is desired to increase the temperature in order to increase the rate or speed of decomposition of the ozone the catalyst or the air or both may be heated for instance by a small heating coil placed within the air duct at a place prior to the catalyst or placed between the fibers of my supported catalyst.

What I claim is:

The method of decomposing ozone in a gaseous medium, which comprises passing a stream of gaseous medium containing ozone through a unitary catalyst mass comprising a catalyst consisting of a loosely compacted agglomeration of glass wool having a thin surface layer of metallic palladium, whereby said gaseous medium contacts a large surface of metallic palladium to catalytically decompose said ozone.

WILLIAM T. ANDERSON, Jr.